United States Patent [19]
Reed et al.

[11] Patent Number: 6,161,018
[45] Date of Patent: Dec. 12, 2000

[54] METHOD AND SYSTEM FOR ESTIMATING A SUBSCRIBER'S LOCATION IN A WIRELESS COMMUNICATION SYSTEM SERVICE AREA

[75] Inventors: John Douglas Reed; Shu-Shaw (Peter) Wang, both of Arlington, Tex.

[73] Assignee: Motorola, Inc., Schaumburg, Ill.

[21] Appl. No.: 09/032,007

[22] Filed: Feb. 27, 1998

[51] Int. Cl.[7] .................................................. H04Q 7/36
[52] U.S. Cl. .................... 455/456; 455/11.1; 455/404; 455/427; 455/456; 455/521; 342/464; 342/457; 342/458; 701/300
[58] Field of Search .............................. 455/11.1, 67.6, 455/404, 422, 427, 456, 457, 521; 342/357, 453, 457, 450, 451, 458, 463, 464; 701/300

[56] References Cited

U.S. PATENT DOCUMENTS

| | | | |
|---|---|---|---|
| 4,799,062 | 1/1989 | Sanderford, Jr. et al. | 455/450 |
| 5,802,492 | 9/1998 | DeLorme et al. | 342/457 |
| 5,999,131 | 12/1999 | Sullivan | 342/465 |
| 6,026,304 | 2/2000 | Hilsenrath et al. | 455/456 |

OTHER PUBLICATIONS

Internet web page describing RadioCamera™ made by U.S. Wireless Corporation, "Labyrinth Communications Group, Inc.".

Primary Examiner—Fan Tsang
Assistant Examiner—Keith Ferguson
Attorney, Agent, or Firm—L. Bruce Terry

[57] ABSTRACT

At a receiver location in a wireless communication system service area, a set of characteristics that describe a received ray of a subscriber signal is measured. In a model of the wireless communication system service area, a propagation path of a model ray launched from a location in the model of the wireless communication system service area that corresponds to the receiver location in the wireless communication system service area is determined, wherein the ray has model signal characteristics based upon the set of characteristics that describe the received ray of the subscriber signal. Thereafter, a subscriber location in the wireless communication system service area is estimated in response to the propagation path of the model ray.

36 Claims, 7 Drawing Sheets

TIME MICRO-SECONDS

METHOD AND SYSTEM FOR ESTIMATING A SUBSCRIBER'S LOCATION IN A WIRELESS COMMUNICATION SYSTEM SERVICE AREA

CROSS-REFERENCE TO RELATED APPLICATIONS

This application is related to application Ser. No. 08/924,151, filed Sep. 5, 1997, entitled "Method and System for Estimating a Subscriber's Location in a Cluttered Area," which is incorporated herein by this reference.

FIELD OF THE INVENTION

This invention relates in general to communication systems and, more particularly, to a method of estimating a subscriber's location within a wireless communications system.

BACKGROUND OF THE INVENTION

In a wireless communication system, it is often desirable to locate users or subscribers who are making calls. Applications for such location estimating technology may include locating subscribers that are requesting 911-emergency services, so that police, fire, or ambulance services may be efficiently dispatched to the user. Other applications for location technology include cellular fraud detection, aiding police investigations, billing based upon location, providing location-based information to the subscriber, and the like.

Known methods for estimating a subscriber's location in a cellular communications system include using a global positioning system (GPS) unit at the subscriber unit, using the time difference of signals arriving at multiple base stations to compute the subscriber's location, and recording and subsequently recognizing a subscriber's radio frequency signals from a plurality of known locations throughout the subscriber service area. While each of these known methods may work under certain circumstances, each of these methods have disadvantages.

For example, using a GPS receiver at the subscriber unit has the disadvantages of increasing the subscriber unit size, weight, and battery drain. Additionally, GPS units may be to costly to include in a competitively priced subscriber unit.

The disadvantage of using time difference of arriving signals is that it may not work in a cluttered area, such as a downtown or business district having tall buildings. In the cluttered area, signals are reflected and diffracted in a way that lengthens the propagation path between the subscriber unit and the base station. When the propagation path is lengthened, the time of arriving signals does not accurately represent the radial distance from the base station to the subscriber. Thus, conventional geometry and location algorithms will fail due to misleading times of arriving signals.

With regard to the system that recognizes previously recorded radio frequency signatures, disadvantages include the difficulty of taking enough measurements to produce an accurate database with a useful resolution, the susceptibility of the system to small changes in a receiving cell site configuration or small changes to the environment, and the difficulty of accurately determining the known locations that are recorded in the database.

Therefore, it should be apparent that a need exist for an improved method and system for estimating a subscriber's location in a wireless communications system service area, wherein expensive components are not required in the subscriber unit and wherein the subscriber's location may be accurately estimated in a cluttered environment without the need for manually measuring radio signals.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
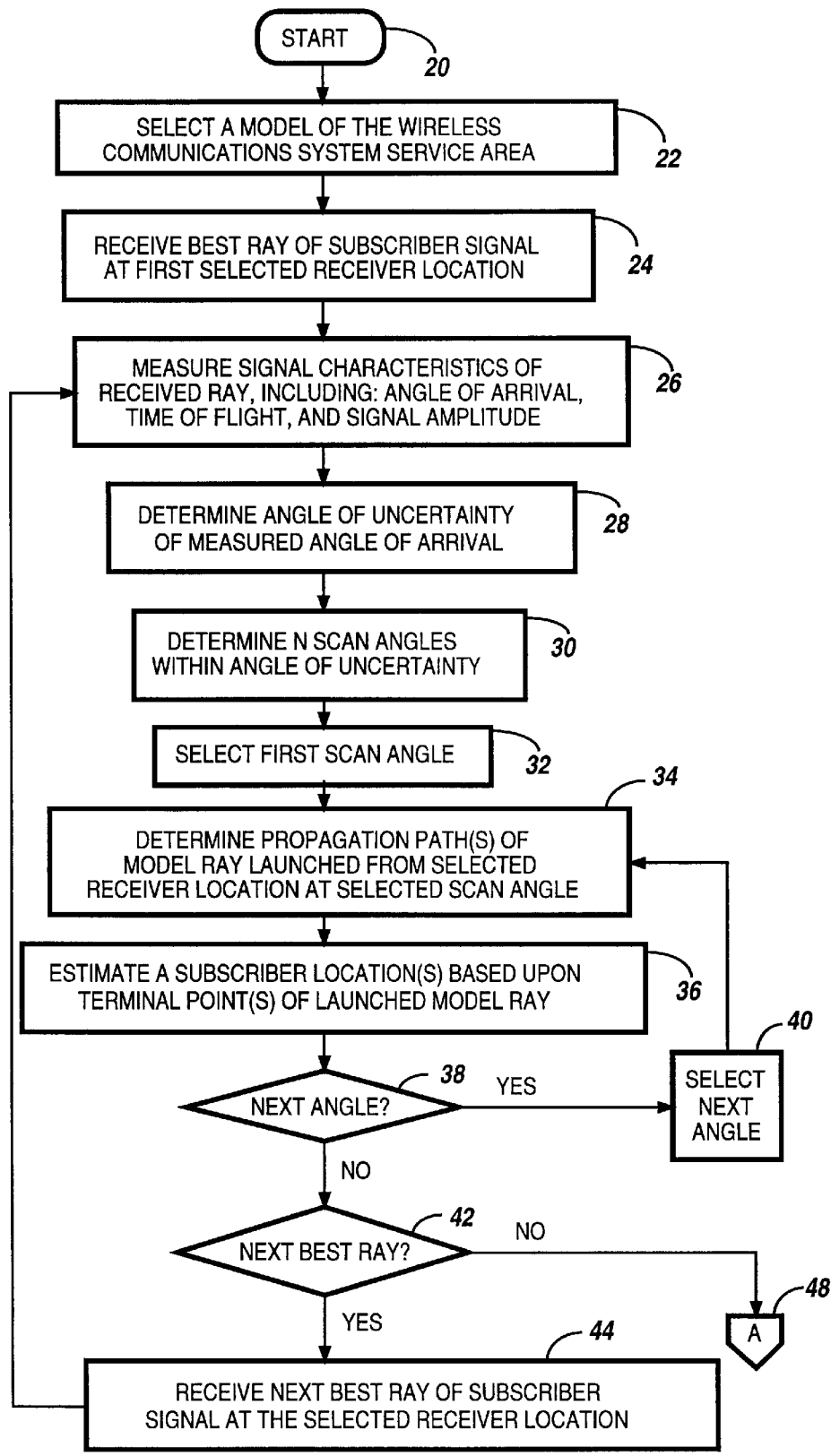
FIG. 1 and FIG. 2 comprise a high-level logic flowchart which illustrates the method and system operation of estimating a subscriber's location according to the present invention.
Figure 2:
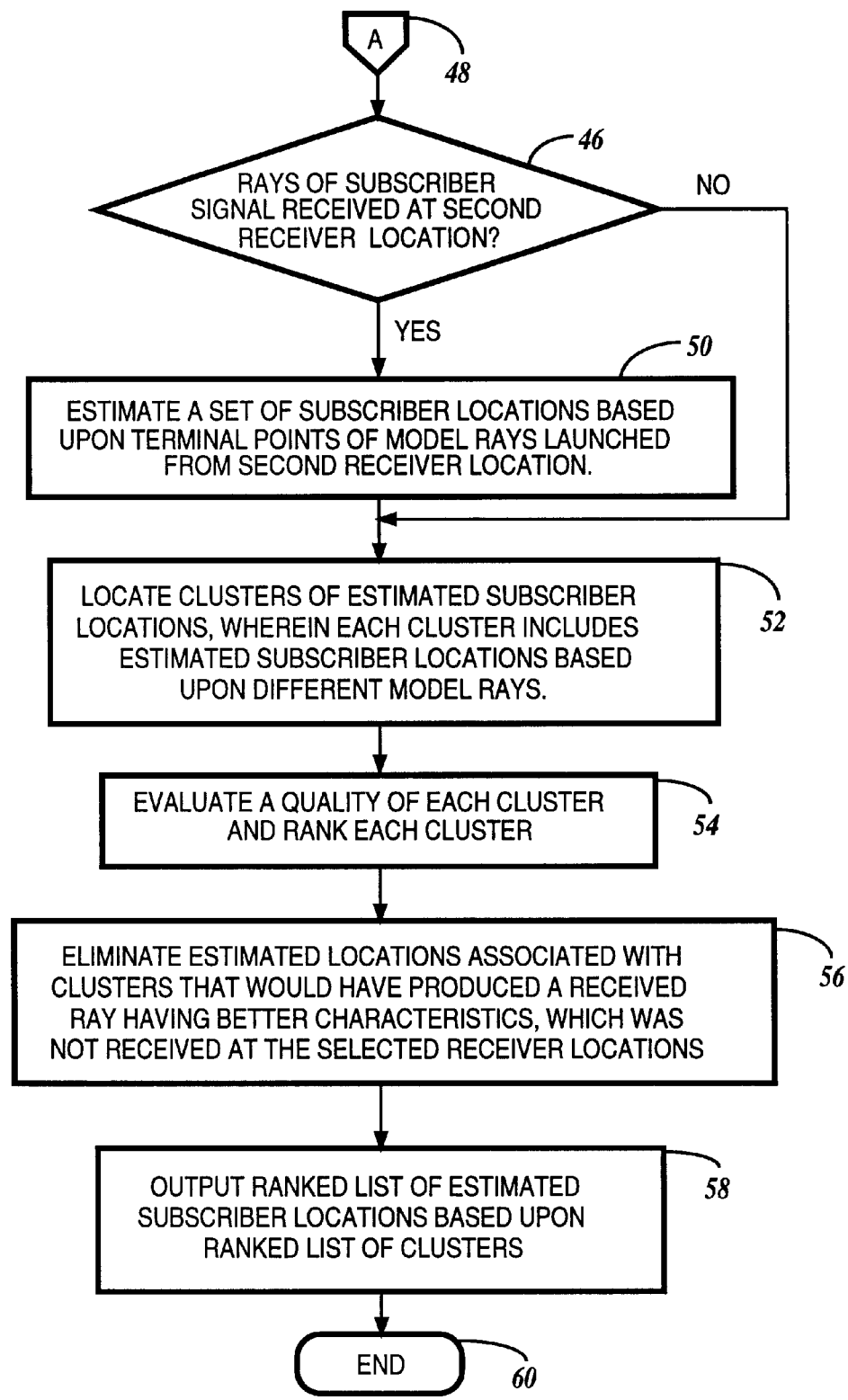

With reference to FIGS. 1 and 2, there is depicted a high-level logic flowchart which illustrates the method and system operation of the present invention. As illustrated, the depicted process begins at block 20 and thereafter passes to block 22 wherein a model of the wireless communications system service area is selected. In one embodiment of the present invention such a model may be implemented with a computer model that represents, the relative location of buildings and other structures that may reflect, diffract, or otherwise affect a radio frequency signal transmitted by a subscriber unit in the communication system service area. The computer model may be either a two-dimensional or three-dimensional model.

Figure 3:
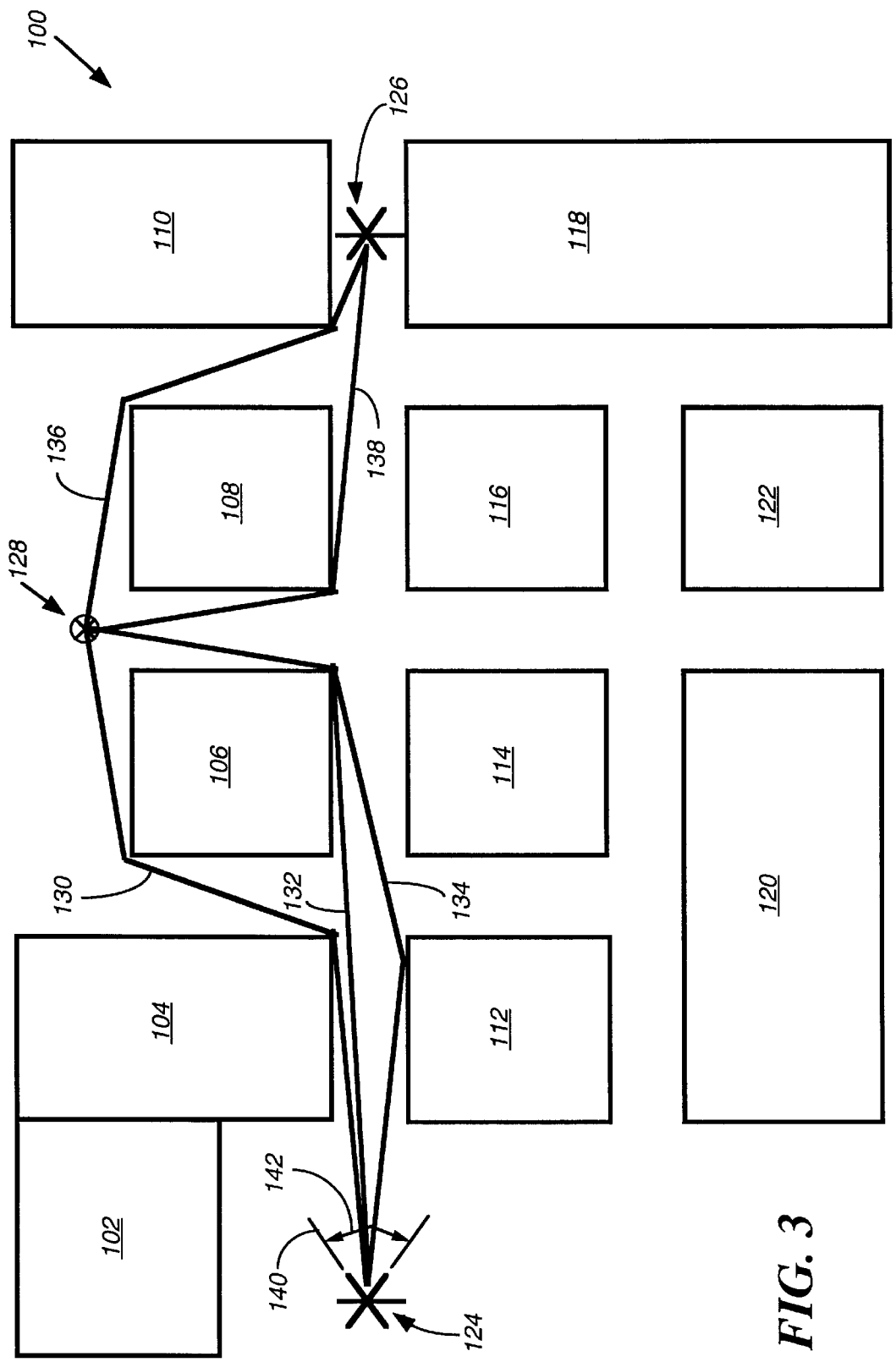
FIG. 3 is a pictorial representation of a wireless communications system service area.

For example, FIG. 3 is a pictorial view or map of wireless communication system service area 100. Service area 100 includes buildings 102–122 located relative to one another as shown. In this example, buildings are the only structures depicted that may affect propagation of a radio frequency signal. Other objects, such as signs, may also be present in the service area.

Service area 100 also includes base stations 124 and 126 for communicating with subscriber unit 128.

As subscriber unit 128 transmits a signal, various rays of that signal are reflected and diffracted along various propagation paths between subscriber unit 128 and base stations 124 and 126. In the example shown in FIG. 3, rays 130–134 take three paths from subscriber 128 to base station 124. Likewise, rays 136 and 138 show paths between subscriber unit 128 and base station 126. Rays 130–138 represent some of the strongest and earliest rays to arrive at base stations 124 and 126 from subscriber unit 128 in the location shown in service area 100. Other rays, which are not shown, are possible and will most likely be present. To simplify this example, these other rays, such as ground reflected rays and rays that travel over the roofs of buildings, have not been shown, although there are methods of modeling these rays.

Figure 4:
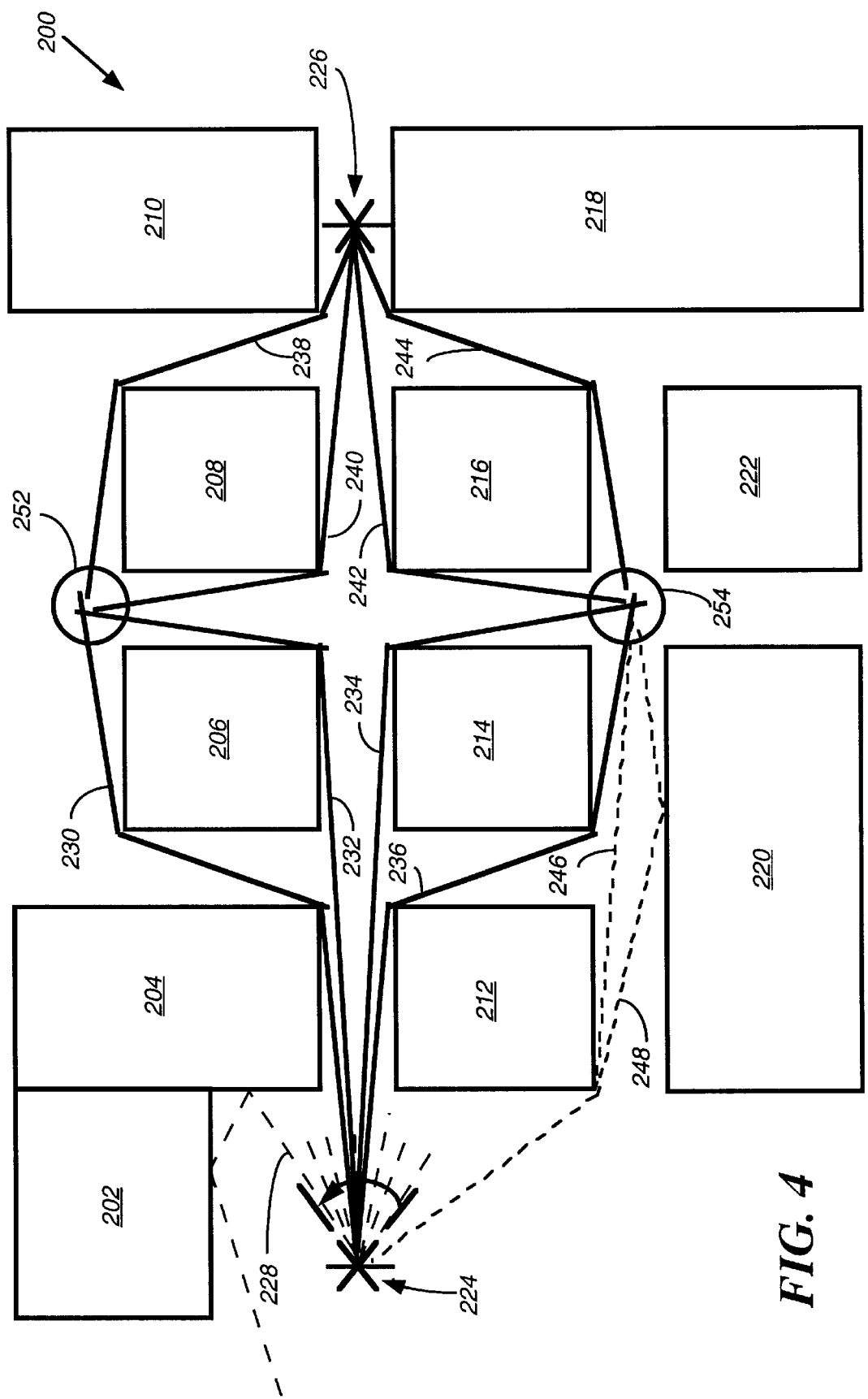
FIG. 4 is a representation of a computer model of the wireless communication system service area of FIG. 3.

Referring now to FIG. 4, computer model 200 represents a model of wireless communications system service area 100 (see FIG. 3) that may be selected by the process as shown in FIG. 1 at block 22. As illustrated in FIG. 4, buildings 202–222 represent computer data representations of buildings 102–122 of an actual service area (see FIG. 3). The computer model may be formed from the reduction of satellite data, aerial photos, or other map-like data into a set of vectors representing buildings and other objects that affect signal propagation. Pre-designed building databases may be purchased from suppliers, such as Spot Data, Inc. The resolution or amount of detail of the model may be chosen by the user, but is generally a function of the wavelength of the radio frequency under study.

After selecting a model of the wireless communication service area, the process receives a best ray of a subscriber signal at a first selected receiver location, as illustrated at block 24. In one implementation, the receiver location is a base station, such as base station 124 in FIG. 3. In one embodiment, the best ray may be the earliest arriving ray, which is usually a strong, easily-received ray because it has propagated the shortest distance. Other criteria for selecting the best ray may be used. A "best ray" should be a ray that gives clear, unambiguous, and statistically reliable information regarding the subscriber's signal and one that permits a quick, easy, and accurate calculation of the subscriber's location.

Next, the process measures the signal characteristics of the received ray, as depicted at block 26. These measured signal characteristics may include angle of arrival, time of flight, and signal amplitude. While all these measurements may not be necessary, more information regarding the received ray may result in more accurate calculations and assumptions in estimating the subscriber's location.

A more complete list of signal characteristics of the received ray that may be measured includes: time of flight (TOF), time difference of arrival (TDOA), angle of arrival (AOA), angle of arrival difference (AOAD), receive signal strength (RSS), and received signal strength difference (RSSD), signal polarization, and signal fading characteristics in time or frequency. In a preferred embodiment, measurements are made by the base station, using one or more antennas or antenna arrays.

In other embodiments, however, additional information may be collected or measured by the subscriber unit and sent to the base station. For example, in Global System for Mobile Communications (GSM), the subscriber unit measures the signal level (a parameter referred to as RXLEV) and the signal quality (a parameter referred to as RXQUAL). Likewise, in standard IS-95 for code division multiple access cellular communications (CDMA), the subscriber unit measures the relative strengths of signals from various base stations and reports these measurements to the base station in a pilot strength measurement message (PSMM). Thus, in some multiple access air interfaces, absolute measurements may not be easily obtained. In that case, information needed to locate a subscriber unit may be derived from information that is available.

Regarding time of flight, a measurement of the round trip propagation delay may be made by the base station. This involves comparing a time reference obtained by synchronizing to the digital code of the uplink signal, and measuring the time offset between the uplink signal and the downlink signal, and remembering that the offset also includes the processing delay of the subscriber unit. By removing the subscriber's processing delay from the calculated time delay, the remaining time is twice the time of flight from subscriber to base since it is a round trip measurement. Thus half of the round trip propagation delay time represents the time of flight (TOF). Processing delay times of subscriber units can be pre-measured to compensate for variations between types of subscriber units.

Figure 8:
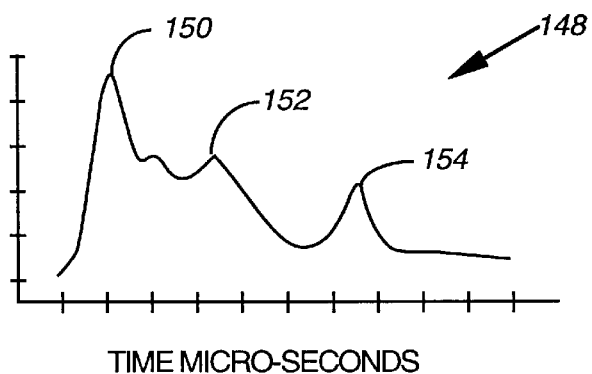
FIG. 8 is a graph illustrating signal strength versus time of a received signal having multiple rays.

Because in some air-interfaces time of flight is not easy to measure, the present invention may alternatively use time difference of arrival. These measurements may be made by measuring the relative difference between the arrival of a subscriber transmit signal at two or more base stations. Also, a time difference of arrival may be calculated between two rays at the same base station, wherein each ray has a separate propagation path from the subscriber to the common base station. FIG. 8 illustrates a time plot of a received signal strength, which may be referred to as power delay profile 148. This plot depicts the arrival of rays of a signals as a function of time, and shows relative power of each ray. The bandwidth of the channel influences the shape of the plot; smaller bandwidths will cause more smoothing, and higher bandwidths will produce more resolution of individual rays.

As shown, first arriving ray 150 is the most powerful ray, which is typical, but not always the case. Two additional rays, 152 and 154, are each delayed in time from the first arriving ray. The time between arriving rays can be used in the measured set of characteristics of the received signal, and further used in the evaluation of the quality of the location estimate.

The received signal strength (RSS) is indicated by the magnitudes of the peaks of the rays 150, 152, and 154, and may also be used to describe the total power in power delay profile 148. The differences between received signal strengths at different base stations may be used as a signal characteristic if no absolute power reference is available. In addition, the difference between the magnitudes of the signal strengths of individual rays arriving at a common base station may be used as a characteristic of the measured signal, and used in the evaluation of the quality of the location estimate.

In one embodiment of the present invention, an angle of arrival measurement may be crudely determined by the fact that it was received on one of the sector antennas of a sectorized base station. For example, in a six sector base station, the angle of arrival may be determined within 60 degrees by determining which one of the six sectors received the signal. In another embodiment, an antenna array may be used to more precisely analyze the direction from which the ray was received.

After measuring the signal characteristics of the received ray, the process determines an angle of uncertainty of the measured angle of arrival, as illustrated at block 28. This angle of uncertainty is related to the accuracy of the measured angle of arrival. This accuracy may also be referred to as the discrimination angle of the antenna. For example, if an antenna array is used to measure the angle of arrival, an antenna array having a greater number of elements may have a smaller angle of uncertainty than an antenna array having a fewer number of elements. In another embodiment that uses sectorized antennas to determine the angle of arrival, the angle of uncertainty may be equal to the angle covered by the receiving sector.

An example of these measurements is shown in FIG. 3, wherein base station 124 is divided into six sectors, and sector 140 receives rays 130–134. Sector 140 is designed to receive rays that arrive at base station 124 within angle 142. If sector 140 is served by one antenna having a receive pattern that covers angle 142, the angle of uncertainty of an angle of arrival measurement at base 124 may be set equal to angle 142. However, if sector 140 is served by an antenna array capable of measuring an angle of arrival with a resolution greater than angle 142, then a smaller angle of uncertainty may be determined.

Next, the process determines N scan angles that fall within the angle of uncertainty, as depicted at block 30. The number N is an integer greater than 1. In a preferred embodiment, the angle of uncertainty is equally divided into N scan angles that fall within the boundaries that defines the angle of uncertainty. The short dashed lines extending from base station 224 illustrate the N scan angles.

After determining N scan angles, the process selects a first scan angle, as illustrated at block 32. Thereafter, the process determines a propagation path of a model ray launched from the selected receiver location at the selected scan angle, as depicted at block 34. In a preferred embodiment, this propagation path is determined using ray-tracing techniques wherein the ray is reflected by walls of buildings and diffracted by building corners. In FIG. 4, model rays are shown at reference numerals 228–248. Propagation path 228 may indicate a propagation path associated with a first scan angle.

Note that a terminal point of the launched model ray may be determined because a time of flight has been previously measured in block 26. Although a time of flight may be useful, some embodiments of the present invention may not need time of flight information, relying instead upon an analysis of intersections of different model rays in computer model 200.

Figure 5:
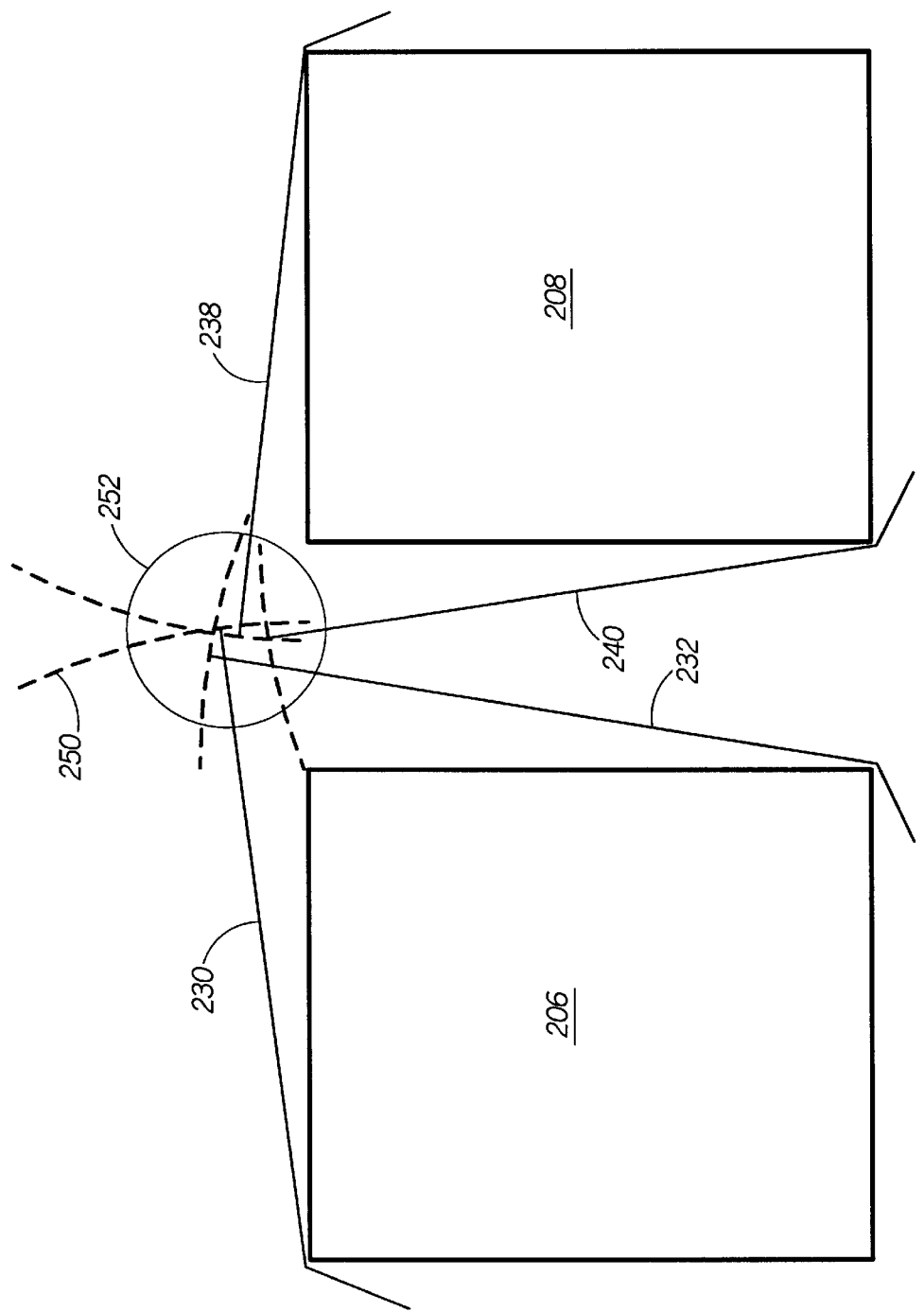
FIG. 5 is a more detailed view of the computer model of FIG. 3.

Note that a ray that has been diffracted may have an infinite number of paths as it is radiated from a diffraction corner. Thus, instead of having a single terminal point and a single path, a model ray may have a set of paths and points following its final diffraction corner. This is illustrated more clearly in FIG. 5 wherein model ray 230 produces a set of terminal points that form arc 250. Other arcs are shown as dashed lines associated with model rays 232, 238, and 240.

After determining the propagation path or paths of the model ray, the process estimates a subscriber location based upon the terminal point of the launched model ray, as illustrated at block 36.

After estimating a subscriber location, the process determines whether or not model rays have been launched at each of the N scan angles as depicted at decision block 38. If the process has not launched a model ray at each scan angle, the process selects the next scan angle, as illustrated at block 40. Thereafter, the process iteratively returns to block 34 to determine a new propagation path for the newly selected scan angle.

Referring again to block 38, if the process has launched model rays at each scan angle, the process then determines whether or not there is a next best ray received at the first selected receiver location, as depicted at decision block 42. If there is a next best ray which has not been used as described above, the process receives the next best ray of the subscriber signal at the selected receiver location, as illustrated at block 44. Thereafter, the process iteratively returns to block 26, wherein the signal characteristics of the next best ray are measured.

Referring again to decision block 42, if the process determines that all relevant rays have been received and modeled as described above, the process continues at decision block 46 (see FIG. 2) via off page connector 48. As shown in FIG. 2 at block 46, the process next determines whether or not rays of the subscriber signal are received at a second receiver location. If rays of the subscriber signal are received at a second receiver location, the process similarly estimates a set of subscriber locations based upon terminal points of model rays launched from the second receiver location, as depicted at block 50. This step may be implemented in a manner similar to that described with reference to blocks 24–44, above. If rays of the subscriber signal are not received at a second receiver location, the process skips the operation at block 50 and proceeds to block 52.

As illustrated at block 52, the process next locates clusters of estimated subscriber locations, wherein each cluster includes estimated subscriber locations based upon different model rays. A cluster of estimated subscriber locations may be defined as estimated locations that are collected or grouped closely together. The goal is to find estimated locations that form a bunch and do not appear to be randomly scattered over the model of the service area.

In a preferred embodiment, clusters may be located by determining whether or not estimated locations fall within the circumference of a circle having a predetermined radius. For example, with reference to FIG. 5, some possible terminal points of rays 230, 232, 238, and 240 fall within the circle shown at reference numeral 252 and thus may be considered a cluster of estimated subscriber locations. In FIG. 4, two clusters are illustrated: cluster 252 and cluster 254.

Next, the process evaluates a quality of each cluster and each cluster is ranked, as depicted at block 54. In one embodiment, the quality of each cluster may be determined by the minimum radius of circle that includes each estimated location in the cluster. Using this technique, a circle with a smaller radius has a higher quality than a circle with a larger radius.

In another embodiment, the quality of the cluster may be related to the distance between each estimated subscriber location and a selected point in model 200. For example, the selected point may be the geometric center of the estimated subscriber locations, and the cluster quality may be calculated by finding the square root of the sum of the squares of the distances from the estimated subscriber locations to the selected point.

After the clusters have been ranked according to quality, the process may eliminate locations associated with clusters that would have produced a received ray having better characteristics, which was not actually received at the selected receiver locations in service area 100, as illustrated at block 56. This step may be implemented by modeling and predicting characteristics of a verification ray, which is launched from either the base station or the estimated subscriber location associated with the cluster.

After launching the verification ray, the process may use ray tracing techniques to estimate the characteristics of the verification ray at the receiver location in the model of the wireless communications system. Then the estimated characteristics and the measured set of characteristics are compared, and the quality of the estimated subscriber location is determined based upon the comparison. For example, if a model verification ray was launched from the location represented by cluster 254, rays 246 and 248 should be received at base station 224. If rays like model rays 246 and 248 were not received at base station 124, the comparison between the estimated characteristics of a variation ray and the measured set of characteristics reveals that an expected ray was not received at base station 124. Thus, a quality of cluster 254 may be lowered in response to not receiving an expected ray that should have been received if indeed cluster 254 represents the actual location of the subscriber unit.

Finally, the process outputs a ranked list of estimated subscriber locations based upon the ranked list of clusters, as depicted at block 58. In a preferred embodiment, each cluster of estimated subscriber locations may be resolved into a single estimated subscriber location. This may be accomplished by locating the geometric center of the smallest circle that contains each of the estimated subscriber locations. The size of the circle may also be considered if a reliability or confidence factor is calculated and associated with a location estimate.

In another embodiment, a geometric center of all estimated subscriber locations in a cluster may be found by locating a "balancing point" that represents a center of gravity of all the cluster's estimated locations assuming they all have the same weight. In yet another embodiment, different estimated locations in a cluster may be weighted according to a confidence or reliability factor associated with the determination of the propagation path of the model ray. For example, the angle of uncertainty of the measurement at one base station may be smaller than the angle of uncertainty at another base station. Thus, estimated locations based upon measurements at the base station with the smaller angle of uncertainty may be given a greater weight than other estimated locations.

The process of estimating a subscriber location may then be terminated, as illustrated at block 60. Of course, after the present invention provides a ranked list of estimated subscriber locations, a post processing operation may present such a list in textual or graphical form, or further processing may be done to eliminate items in the list having less than a predetermined quality or confidence factor.

Figure 6:
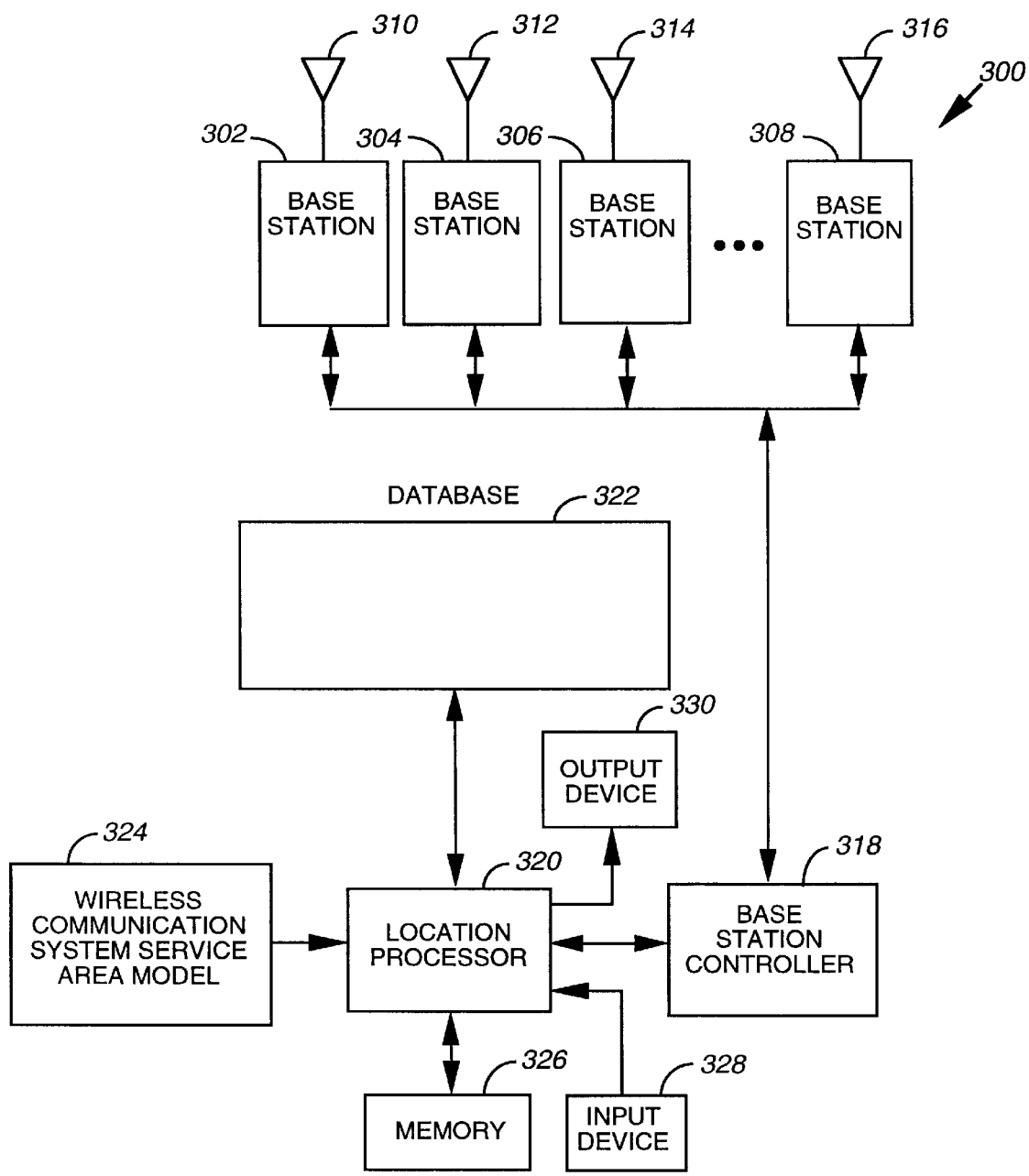
FIG. 6 is a high-level block diagram of a system for estimating a subscriber's location in accordance with the present invention.

With reference now to FIG. 6, there is depicted a high-level block diagram of a system for estimating a location of a subscriber unit in a wireless communication service area in accordance with the present invention. As illustrated, location system 300 includes base stations 302–308. Each base station 302–308 is coupled to a base station antenna 310–316, respectively. In a preferred embodiment of the present invention, antennas 310–316 are adapted to determine an angle of arrival of a radio frequency signal transmitted from a subscriber unit. Antenna systems having this capability include sectorized antennas and adaptive array antennas, which are able to form an antenna pattern in a selected direction to determine an angle of arrival with an accuracy defined by an angle of uncertainty. Note that different types of antennas may have different angles of uncertainty, as discussed above. Antennas 310–316 are typically evenly dispersed throughout the communication system coverage area 100 in order to provide service over the entire area.

Base stations 302–308 are coupled to base station controller 318, which may be centrally located relative to base stations 302–308. Base station controller 318 is responsible for controlling base station operation, and other functions such as handoffs between base stations.

As an internal or external part of base station controller 318, location processor 320 is coupled to base station controller 318 for passing signal characteristic data and control data. Location processor 320 may be implemented with an appropriately programmed general purpose data processing system, such as an HP 9000 Series 700 Model 735 workstation made by Hewlett-Packard Company, Palo Alto, Calif.

As illustrated, location processor 320 is coupled database 322, wireless communication system service area model 324, memory 326, input device 328, and output device 330. Database 322 may be used for storing records of angles of uncertainty associated with base station antennas 310–316, or other details regarding the operating environment or variations in operation of base stations 302–308.

Wireless communication system service area model 324 includes data describing the location of buildings (and other objects affecting radio frequency propagation) and the location of base station antennas 310–316. This service area model 324 is used to predict model ray propagation paths and calculate signal characteristics of a verification ray transmitted from a selected estimated subscriber location, which may be received at each base station antenna location.

Memory 326 may, among other things, be used to store weighting function coefficients, which may be used to adjust certain parameters or estimates in the subscriber location estimation.

Input device 328 is used to input data, commands, weighting function coefficients, a service area model, or information regarding changes in the service area model. Input device 328 may be implemented with a disk drive unit, keyboard, or other means for providing a source of input.

Output device 330 is used to display a location estimate. Output device 330 may be implemented with a display, which displays the estimated coordinates of the subscriber unit, and which may also display a map of the service area with an indication of the estimated location of the subscriber unit. Several estimated locations may also be displayed, along with an indication of the quality or confidence associated with each one.

Figure 7:
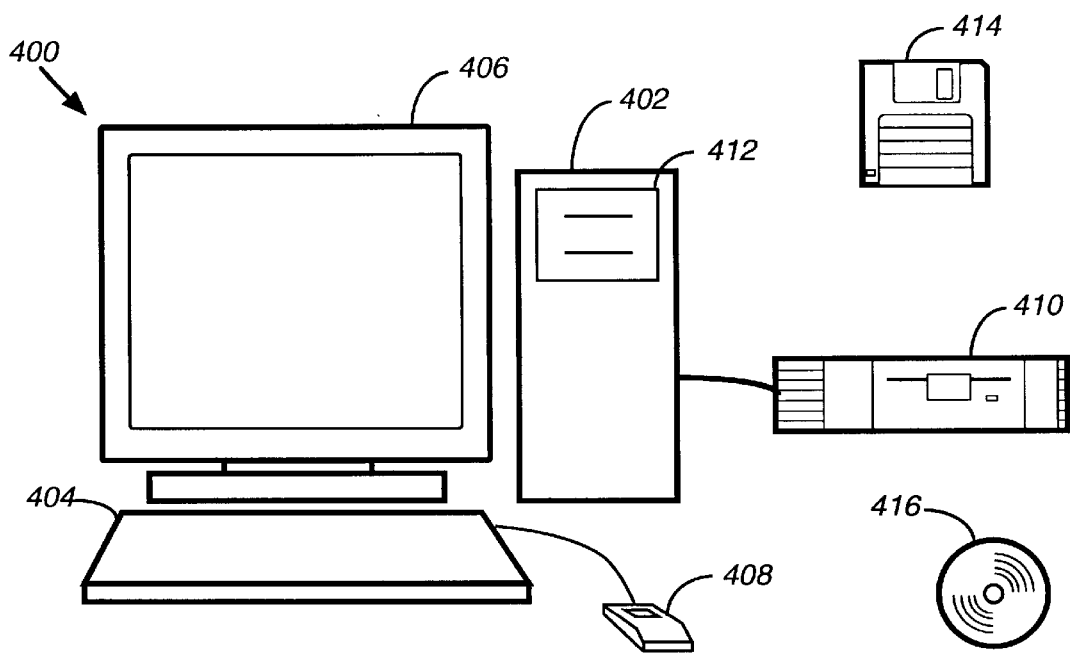
FIG. 7 depicts a data processing system, which may be used to implement an embodiment of the method of the present invention.

With reference now to FIG. 7, there is depicted a data processing system 400, which may be used to implement an embodiment of the method and system of the present invention. Data processing system 400 may include processor 402, keyboard 404, display 406, and pointing device 408. Keyboard 404 provides means for entering data and commands into processor 402. Display 406 may be implemented utilizing any known means for displaying textual, graphical, or video images, such as a cathode ray tube (CRT), a liquid crystal display (LCD), an electroluminescent panel, or the like. Pointing device 408 may be implemented utilizing any known pointing device, such as a trackball, joystick, touch sensitive tablet or screen, track pad, or as illustrated in FIG. 7, a mouse. Pointing device 408 may be utilized to move a pointer or a cursor on display 406.

Processor 402 may be coupled to one or more peripheral devices, such as CD-ROM 410.

Data processing system 400 includes means for reading data from a storage device. Such means for reading data may include: a hard disk drive internal or external to processor 402 (not shown); a tape drive (not shown); floppy disk drive 412, which reads and writes floppy disks 414; or CD-ROM 410, which reads and/or writes compact disk 416. Such storage means may be referred to as a computer usable medium for storing computer readable program code in the form of data and software.

Data processing system 400 may also be coupled to a network which permits the transfer of data and software between data processing systems. Using such a network, programs can be loaded into data processing system 400.

The components of data processing system 400 discussed above may each be implemented utilizing any one of several known off-the-shelf components. For example, data processing system 400 may be implemented utilizing any general purpose computer or so-called workstation, such as the workstation sold under the name "HP 9000 Series 700 Model 735" by Hewlett-Packard Company of Palo Alto, Calif.

In summary, the method and system of the present invention estimates the location of the subscriber unit in a wireless communications system service area. The present invention is especially useful for estimating location in a dense urban area, such as a downtown area including many high-rise buildings. Finding a subscriber location in a dense urban area involves careful analysis of indirect signals, wherein such an indirect signal have been reflected or diffracted, and do not travel in a straight path. Such indirect signals may not arrive from the direction of the transmitting subscriber unit. Additionally, such indirect signals have traveled a distance greater than the straight line distance between the subscriber unit and the base station antenna. Thus, both angle of arrival and time of flight may be misleading indicators of subscriber location.

A variety of methods exist to predict signal propagation, including the method of ray tracing. It is common in all methods of propagation prediction to adapt, scale, or modify the prediction model by the use of correction factors. These factors can be applied to the calculation of a propagation prediction, or after its calculation when the prediction is evaluated. The factors may include shifting or scaling the average, adjusting the result as a function of distance adjusting the loss associated with reflections or diffractions (which may be a function of angle). Adjustments to material properties of particular buildings, or the size, shape, and physical characteristics of the buildings or the ground may be made. Adjustments may also be made based on specific locations where the prediction error is larger than desired.

While the present invention has been described and illustrated with examples that use a two-dimensional service area model and two-dimensional ray-tracing techniques, a three-dimensional service area model may also be used in order to determine a subscriber location in three dimensions. Using a three-dimensional model, a location estimating system may be able to locate a subscriber at, say, the fifth floor of a building at Main and First streets.

A three-dimensional location estimating system may be implemented using base stations having antennas that are adapted to measure a vertical angle of a received signal. Alternatively, base station antennas located at various heights above street level may be sampled so that angle of arrival and time measurements are three-dimensional in nature.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for estimating a subscriber location of a subscriber unit in a wireless communication system service area comprising the steps of:

at a receiver location in the wireless communication system service area, measuring a set of characteristics that describe a received ray of a subscriber signal;

in a computer model of the wireless communication system service area, determining a propagation path of a model ray launched from a location in the model of the wireless communication system service area that corresponds to the receiver location in the wireless communication system service area, wherein the model ray has model signal characteristics based upon the set of characteristics that describe the received ray of the subscriber signal, and wherein the model includes an object that can change the propagation path of the model ray; and estimating a subscriber location in the wireless communication system service area in response to the propagation path of the model ray.

2. The method for estimating a subscriber location according to claim 1 wherein the set of characteristics that describe the received ray of the subscriber signal include a time of flight, an angle of arrival, and a signal amplitude.

3. The method for estimating a subscriber location according to claim 1 wherein an angle of arrival measurement includes an angle of uncertainty, and further including the steps of:

in the model of the wireless communication system service area, determining M propagation paths of M model rays launched from the location in the model of the wireless communication system service area that corresponds to the receiver location, wherein M is an integer greater than 1, and wherein each of the M model rays are launched at an angle within the angle of uncertainty of the angle of arrival measurement;

estimating a first set of M estimated subscriber locations in the wireless communication system service area in response to the M propagation paths of the M model rays; and estimating a subscriber location in the wireless communication system service area in response to the first set of M estimated subscriber locations.

4. The method for estimating a subscriber location according to claim 3 further including the steps of:

at a second receiver location in the wireless communication system service area, measuring a second set of characteristics that describe a second received ray of the subscriber signal;

in the model of the wireless communication system service area, determining N propagation paths of N model rays launched from a second location in the model of the wireless communication system service area that corresponds to the second receiver location in the wireless communication system service area, wherein N is an integer greater than 1, and wherein each of the N model rays are launched at an angle within a second angle of uncertainty of a second angle of arrival measurement;

estimating a second set of N estimated subscriber locations in the wireless communication system service area in response to the N propagation paths of the N model rays; and selecting a final estimated subscriber location based on the first set of M estimated subscriber locations and the second set of N estimated subscriber locations.

5. The method for estimating a subscriber location according to claim 4 wherein the second receiver location is the same as the receiver location.

6. The method for estimating a subscriber location according to claim 4 wherein the step of selecting a final estimated subscriber location based on the estimated subscriber locations further includes the steps of:
   determining a degree of clustering of clusters of estimated subscriber locations, wherein each cluster includes an estimated subscriber location in both the first and second sets of estimated subscriber locations; and
   selecting a final estimated subscriber location based upon the degree of clustering of the clusters of estimated subscriber locations.

7. The method for estimating a subscriber location according to claim 6 wherein the step of determining a degree of clustering further includes determining a degree of clustering based upon distances between a selected point and selected estimated subscriber locations in the cluster of estimated subscriber locations.

8. The method for estimating a subscriber location according to claim 1 wherein the step of determining a propagation path of a model ray further includes determining a propagation path of a model ray using ray-tracing techniques.

9. The method for estimating a subscriber location according to claim 1 wherein the propagation path of the model ray has a terminal point, and wherein the step of estimating a subscriber location further includes estimating that the subscriber location is the terminal point of the propagation path of the model ray.

10. The method for estimating a subscriber location according to claim 1 further including the step of:
   verifying the estimated subscriber location by:
      launching, in the model, a verification ray from the estimated subscriber location;
      estimating characteristics of the verification ray at the location in the model of the wireless communication system service area that corresponds to the receiver location in the wireless communication system service area;
      comparing the estimated characteristics of the verification ray with the measured set of characteristics that describe the received ray of the subscriber signal; and
      determining a quality of the estimated subscriber location based upon the comparison of the estimated characteristics of the verification ray and the measured set of characteristics that describe the received ray of the subscriber signal.

11. The method for estimating a subscriber location according to claim 10 wherein the step of determining a quality of the estimated subscriber location further includes decreasing a quality of the estimated subscriber location in response to the measured set of characteristics that describe the received ray of the subscriber signal differing, by a predetermined threshold, from the estimated characteristics of the verification ray.

12. The method for estimating a subscriber location according to claim 1 further including the steps of:
   measuring a set of signal characteristics that describe a received ray of a subscriber signal transmitted from a known location in the wireless communication system service area; and
   adjusting factors used in determining the estimated subscriber location in response to comparing a correlation between the estimated subscriber location and the known location.

13. A system for estimating a subscriber location of a subscriber unit in a wireless communication system service area comprising:
   means for measuring a set of characteristics that describe a received ray of a subscriber signal at a receiver location in the wireless communication system service area;
   means for determining a propagation path of a model ray in a model of the wireless communication system service area launched from a location in the model of the wireless communication system service area that corresponds to the receiver location in the wireless communication system service area, wherein the model ray has model signal characteristics based upon the set of characteristics that describe the received ray of the subscriber signal, and wherein the model includes an object that can change the propagation path of the model ray; and
   means for estimating a subscriber location in the wireless communication system service area in response to the propagation path of the model ray.

14. The system for estimating a subscriber location according to claim 13 wherein the set of characteristics that describe the received ray of the subscriber signal include a time of flight, an angle of arrival, and a signal amplitude.

15. The system for estimating a subscriber location according to claim 14 wherein an angle of arrival measurement includes an angle of uncertainty, and further including:
   means for determining M propagation paths of M model rays in the model of the wireless communication system service area launched from the location in the model of the wireless communication system service area that corresponds to the receiver location, wherein M is an integer greater than 1, and wherein each of the M model rays are launched at an angle within the angle of uncertainty of the angle of arrival measurement;
   means for estimating a first set of M estimated subscriber locations in the wireless communication system service area in response to the M propagation paths of the M model rays; and
   means for estimating a subscriber location in the wireless communication system service area in response to the first set of M estimated subscriber locations.

16. The system for estimating a subscriber location according to claim 15 further including:
   means for measuring a second set of characteristics that describe a second received ray of the subscriber signal at a second receiver location in the wireless communication system service area;
   means, in the model of the wireless communication system service area, for determining N propagation paths of N model rays launched from a second location in the model of the wireless communication system service area that corresponds to the second receiver location in the wireless communication system service area, wherein N is an integer greater than 1, and wherein each of the N model rays are launched at an angle within a second angle of uncertainty of a second angle of arrival measurement;
   means for estimating a second set of N estimated subscriber locations in the wireless communication system service area in response to the N propagation paths of the N model rays; and
   means for selecting a final estimated subscriber location based on the first set of M estimated subscriber locations and the second set of N estimated subscriber locations.

17. The system for estimating a subscriber location according to claim 15 wherein the second receiver location is the same as the receiver location.

18. The system for estimating a subscriber location according to claim 16 wherein the means for selecting a final estimated subscriber location based on the estimated subscriber locations further includes:
   means for determining a degree of clustering of clusters of estimated subscriber locations, wherein each cluster includes an estimated subscriber location in both the first and second sets of estimated subscriber locations; and
   means for selecting a final estimated subscriber location based upon the degree of clustering of the clusters of estimated subscriber locations.

19. The system for estimating a subscriber location according to claim 18 wherein the means for determining a degree of clustering further includes means for determining a degree of clustering based upon distances between a selected point and selected estimated subscriber locations in the cluster of estimated subscriber locations.

20. The system for estimating a subscriber location according to claim 13 wherein the means for determining a propagation path of a model ray further includes means for determining a propagation path of a model ray using ray-tracing techniques.

21. The system for estimating a subscriber location according to claim 13 wherein the propagation path of the model ray has a terminal point, and wherein the means for estimating a subscriber location further includes means for estimating that the subscriber location is the terminal point of the propagation path of the model ray.

22. The system for estimating a subscriber location according to claim 13 further including:
   means for verifying the estimated subscriber location including:
      means for launching, in the model, a verification ray from the estimated subscriber location;
      means for estimating characteristics of the verification ray at the location in the model of the wireless communication system service area that corresponds to the receiver location in the wireless communication system service area;
      means for comparing the estimated characteristics of the verification ray with the measured set of characteristics that describe the received ray of the subscriber signal; and
      means for determining a quality of the estimated subscriber location based upon the comparison of the estimated characteristics of the verification ray and the measured set of characteristics that describe the received ray of the subscriber signal.

23. The system for estimating a subscriber location according to claim 22 wherein the means for determining a quality of the estimated subscriber location further includes means for decreasing a quality of the estimated subscriber location in response to the measured set of characteristics that describe the received ray of the subscriber signal differing, by a predetermined threshold, from the estimated characteristics of the verification ray.

24. The system for estimating a subscriber location according to claim 13 further including:
   means for measuring a set of signal characteristics that describe a received ray of a subscriber signal transmitted from a known location in the wireless communication system service area; and
   means for adjusting factors used in determining the estimated subscriber location in response to comparing a correlation between the estimated subscriber location and the known location.

25. A computer program product comprising:
   a computer useable medium having computer readable program code means embodied therein for estimating a location of a subscriber unit in a wireless communication system service area comprising:
      computer readable program code means for measuring a set of characteristics that describe a received ray of a subscriber signal at a receiver location in the wireless communication system service area;
      computer readable program code means for determining a propagation path of a model ray launched in a model of the wireless communication system service area from a location in the model of the wireless communication system service area that corresponds to the receiver location in the wireless communication system service area, wherein the model ray has model signal characteristics based upon the set of characteristics that describe the received ray of the subscriber signal, and wherein the model includes an object that can change the propagation path of the model ray; and
      computer readable program code means for estimating a subscriber location in the wireless communication system service area in response to the propagation path of the model ray.

26. The system for estimating a subscriber location according to claim 25 wherein the set of characteristics that describe the received ray of the subscriber signal include a time of flight, an angle of arrival, and a signal amplitude.

27. The system for estimating a subscriber location according to claim 26 wherein an angle of arrival measurement includes an angle of uncertainty, and further including:
   computer readable program code means for determining M propagation paths of M model rays in the model of the wireless communication system service area launched from the location in the model of the wireless communication system service area that corresponds to the receiver location, wherein M is an integer greater than 1, and wherein each of the M model rays are launched at an angle within the angle of uncertainty of the angle of arrival measurement;
   computer readable program code means for estimating a first set of M estimated subscriber locations in the wireless communication system service area in response to the M propagation paths of the M model rays; and
   computer readable program code means for estimating a subscriber location in the wireless communication system service area in response to the first set of M estimated subscriber locations.

28. The system for estimating a subscriber location according to claim 27 further including:
   computer readable program code means for measuring a second set of characteristics that describe a second received ray of the subscriber signal at a second receiver location in the wireless communication system service area;
   computer readable program code means for determining N propagation paths of N model rays in the model of the wireless communication system service area launched from a second location in the model of the wireless communication system service area that corresponds to the second receiver location in the wireless communication system service area, wherein N is an integer greater than 1, and wherein each of the N model rays are launched at an angle within a second angle of uncertainty of a second angle of arrival measurement;

computer readable program code means for estimating a second set of N estimated subscriber locations in the wireless communication system service area in response to the N propagation paths of the N model rays; and computer readable program code means for selecting a final estimated subscriber location based on the first set of M estimated subscriber locations and the second set of N estimated subscriber locations.

29. The system for estimating a subscriber location according to claim 28 wherein the second receiver location is the same as the receiver location.

30. The system for estimating a subscriber location according to claim 28 wherein the computer readable program code means for selecting a final estimated subscriber location based on the estimated subscriber locations further includes:

computer readable program code means for determining a degree of clustering of clusters of estimated subscriber locations, wherein each cluster includes an estimated subscriber location in both the first and second sets of estimated subscriber locations; and computer readable program code means for selecting a final estimated subscriber location based upon the degree of clustering of the clusters of estimated subscriber locations.

31. The system for estimating a subscriber location according to claim 30 wherein the computer readable program code means for determining a degree of clustering further includes computer readable program code means for determining a degree of clustering based upon distances between a selected point and selected estimated subscriber locations in the cluster of estimated subscriber locations.

32. The system for estimating a subscriber location according to claim 25 wherein the computer readable program code means for determining a propagation path of a model ray further includes computer readable program code means for determining a propagation path of a model ray using ray-tracing techniques.

33. The system for estimating a subscriber location according to claim 25 wherein the propagation path of the model ray has a terminal point, and wherein the computer readable program code means for estimating a subscriber location further includes computer readable program code means for estimating that the subscriber location is the terminal point of the propagation path of the model ray.

34. The system for estimating a subscriber location according to claim 25 further including:

computer readable program code means for verifying the estimated subscriber location including:

computer readable program code means for launching, in the model, a verification ray from the estimated subscriber location;

computer readable program code means for estimating characteristics of the verification ray at the location in the model of the wireless communication system service area that corresponds to the receiver location in the wireless communication system service area;

computer readable program code means for comparing the estimated characteristics of the verification ray with the measured set of characteristics that describe the received ray of the subscriber signal; and computer readable program code means for determining a quality of the estimated subscriber location based upon the comparison of the estimated characteristics of the verification ray and the measured set of characteristics that describe the received ray of the subscriber signal.

35. The system for estimating a subscriber location according to claim 34 wherein the computer readable program code means for determining a quality of the estimated subscriber location further includes computer readable program code means for decreasing a quality of the estimated subscriber location in response to the measured set of characteristics that describe the received ray of the subscriber signal differing, by a predetermined threshold, from the estimated characteristics of the verification ray.

36. The system for estimating a subscriber location according to claim 25 further including:

computer readable program code means for measuring a set of signal characteristics that describe a received ray of a subscriber signal transmitted from a known location in the wireless communication system service area; and computer readable program code means for adjusting factors used in determining the estimated subscriber location in response to comparing a correlation between the estimated subscriber location and the known location.

* * * * *

UNITED STATES PATENT AND TRADEMARK OFFICE
CERTIFICATE OF CORRECTION

PATENT NO. : 6,161,018 Page 1 of 1
DATED : December 12, 2000
INVENTOR(S) : Reed et al.

It is certified that error appears in the above-identified patent and that said Letters Patent is hereby corrected as shown below:

Column 10,
Line 10, after "in the", insert -- computer --
Line 16, after "wherein the", insert -- computer --

Column 12,
Lines 9, 10, 16 and 30, before "model", insert -- computer --

Column 14,
Lines 14, 15 and 21, before "model", insert -- computer --

Signed and Sealed this

Twenty-fourth Day of September, 2002

Attest:

JAMES E. ROGAN
Attesting Officer  Director of the United States Patent and Trademark Office